US008666918B2

(12) United States Patent
Sikora et al.

(10) Patent No.: US 8,666,918 B2
(45) Date of Patent: Mar. 4, 2014

(54) VIDEO-GENRE CLASSIFICATION

(75) Inventors: Thomas Sikora, Berlin (DE); Ronald Glasberg, Berlin (DE); Pascal Kelm, Petershagen (DE); Martin Mocigemba, Berlin (DE); Hüseyin Oguz, Istanbul (TK); Sebastian Schmiedeke, Berlin (DE)

(73) Assignee: Technische Universitat Berlin, Berlin (DE)

( * ) Notice: Subject to any disclaimer, the term of this patent is extended or adjusted under 35 U.S.C. 154(b) by 342 days.

(21) Appl. No.: 13/057,421

(22) PCT Filed: Aug. 4, 2009

(86) PCT No.: PCT/EP2009/005890
§ 371 (c)(1),
(2), (4) Date: May 3, 2011

(87) PCT Pub. No.: WO2010/015422
PCT Pub. Date: Feb. 11, 2010

(65) Prior Publication Data
US 2011/0211809 A1    Sep. 1, 2011

(30) Foreign Application Priority Data

Aug. 6, 2008 (DE) .......................... 10 2008 036 521

(51) Int. Cl.
*G06E 1/00* (2006.01)
(52) U.S. Cl.
USPC ......................................................... 706/20
(58) Field of Classification Search
USPC .......................................... 706/12, 20, 45, 62
See application file for complete search history.

(56) References Cited

U.S. PATENT DOCUMENTS

| 2004/0117367 | A1* | 6/2004 | Smith et al. | 707/5 |
| 2010/0005050 | A1* | 1/2010 | Ah-Pine | 706/52 |
| 2010/0280827 | A1* | 11/2010 | Mukerjee et al. | 704/236 |
| 2010/0284623 | A1* | 11/2010 | Chen et al. | 382/224 |

OTHER PUBLICATIONS

Glasberg et al., "New Real-time Approaches for Video-Genre-Classification using High-Level Descriptors and a Set of Classifiers", The IEEE International Conference on Semantic Computing, 2008, pp. 120-127.
Glasberg et al., "An automatic system for real-time video-genres detection using high-level-descriptors and a set of classifiers", Consumer Electronics, 2008, pp. 1-4.
Wang et al., "A study of a multi-class classification algorithm of SVM combined with ART", Natural Computation, 2007, pp. 59-63.
Tax et al., "Combining multiple classifiers by averaging or by multiplying?", Pattern Recognition, 2000, vol. 33, pp. 1475-1485.

(Continued)

*Primary Examiner* — David Vincent
(74) *Attorney, Agent, or Firm* — Foley & Lardner LLP

(57) ABSTRACT

An exemplary embodiment of the invention relates to a method for classifying a video sequence (VS), characterized by the steps of analyzing the video sequence using a plurality of genre-specific detector modules (M1-M5), each genre-specific detector module providing a probability value (P1-P5) indicating the probability that the video sequence belongs to the genre assigned to the genre-specific detector module; and analyzing the probability values of the plurality of genre-specific detector modules using a combiner (CM) which analyzes said probability values and generates a classification signal (SC) classifying the video sequence as belonging to a specific genre (g).

5 Claims, 2 Drawing Sheets

(56) References Cited

OTHER PUBLICATIONS

Lam et al., "Classifier combinations: Implementations and theoretical issues", Lecture notes in Computer Science, 2000, vol. 1857(21), pp. 77-86.

International Search Report received in Marcy 11, 2009 for International Application No. PCT/EP2009/005890 (3 pgs).

* cited by examiner

VIDEO-GENRE CLASSIFICATION

BACKGROUND OF THE INVENTION

The invention relates to a method for classifying a video sequence.

A video classification scheme for detecting commercials is described in U.S. Patent Application Publication US 2007/0261075A1.

Further video classification schemes are described in "New Real-Time Approaches for Video-Genre-Classification using High-Level Descriptors and a Set of Classifiers" (R. Glasberg, S. Schmiedeke, M. Mocigemba, T. Sikora: New Real-Time Approaches for Video-Genre-Classification Using High-Level Descriptors and a Set of Classifiers, IEEE International Conference on Semantic Computing, pages 120-127, 2008). In this paper different approaches for classifying videos are described in detail and compared to each other.

The great challenge in the field of multimedia content analysis is the transformation of human interpretations of audio-visual data to the respective machine processable representation. The difference between these two spheres is the so called "semantic gap". Bridging this gap will open up a wide field of new applications. One possible application is the content selection in TV and World Wide Web according to user-specific profiles, e. g. genres like cartoon, commercial, music, news and sport. Humans perceive genres as patterns of audio-visual sequences describing dimensions like narration, aesthetics etc.

Objective of the Present Invention

The objective of the present invention is to provide a system and method for reliably classifying a video sequence with respect to its genre.

Brief Summary Of The Invention

An embodiment of the invention relates to a method for classifying a video sequence comprising the steps of analyzing the video sequence using a plurality of genre-specific detector modules, each genre-specific detector module providing a probability value indicating the probability that the video sequence belongs to the genre assigned to the genre-specific detector module, and analyzing the probability values of the plurality of genre-specific detector modules using a combiner which analyzes said probability values and generates a classification signal classifying the video sequence as belonging to a specific genre.

Preferably the probability values of the plurality of genre-specific detector modules are analyzed by a first evaluating unit of the combiner. The first evaluating unit may provide a first probability vector comprising for each genre a first probability value indicating the probability that the video sequence belongs to the respective genre. The first evaluating unit may also provide a first preliminary decision indicating which genre the video sequence presumably belongs to.

The probability values of the plurality of genre-specific detector modules may also be analyzed by a second evaluating unit of the combiner. The second evaluating unit may provide a second probability vector indicating for each genre a second probability value indicating the probability that the video sequence belongs to the respective genre. Additionally, the second evaluating unit may also provide a second preliminary decision indicating which genre the video sequence presumably belongs to.

In order to enhance the reliability of the classification process, the first evaluating unit and the second evaluating unit preferably differ in their analyzing algorithm.

If the first and second preliminary decisions indicate the same genre, a classification signal is preferably generated which classifies the video sequence as belonging to said same genre.

If, however, the first and second preliminary decisions indicate different genres, the first and second probability vectors may be further analyzed and the classification signal is preferably generated based on the result of this more detailed analysis.

The step of generating the classification signal preferably includes the additional step of adding the first and second probability vectors and generating a sum vector, wherein each coordinate of said sum vector is assigned to a specific genre. Then, the highest coordinate value of the sum vector may be determined. The genre assigned to the coordinate with the highest coordinate value may then be used for classifying the video sequence.

The step of generating the classification signal may further include the steps of normalizing the sum vector, comparing the highest coordinate value of the normalized sum vector to a reference value, and generating a classification signal that indicates an unreliable classification result if the highest coordinate value is smaller than the reference value.

The first evaluating unit may calculate the first probability vector V1 based on a given product rule, e. g. according to the following equation:

$$V1 = \begin{pmatrix} P1*(1-P2)*\ldots*(1-Pi)*\ldots*(1-Pn) \\ (1-P1)*P2*\ldots*(1-Pi)*\ldots*(1-Pn) \\ (1-P1)*(1-P2)*\ldots*Pi*\ldots*(1-Pn) \\ \ldots \\ (1-P1)*(1-P2)*\ldots*(1-Pi)*\ldots*Pn \end{pmatrix}$$

wherein $Pi$ ($1 \leq i \leq n$) defines the probability value provided by the $i^{th}$ genre-specific detector module associated with the $i^{th}$ genre, and n defines the number of genres and genre-specific detector modules.

The second evaluating unit may calculate the second probability vector using a Support Vector Machine.

A further embodiment of the invention relates to a system for classifying video sequences, comprising a plurality of genre-specific detector modules, each genre-specific detector module providing a probability value indicating the probability that the video sequence belongs to the genre assigned to the genre-specific detector module, and a combiner adapted for analyzing the probability values of the plurality of genre-specific detector modules and generating a classification signal classifying the video sequence as belonging to a specific genre.

Furthermore, the invention is directed to a computer program comprising computer instructions executable by a computer to perform the method steps as explained in detail above.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENT

The preferred embodiment of the present invention will be best understood by reference to the drawings, wherein like parts are designated by like reference signs throughout.

It will be readily understood that the process steps of the present invention, as generally described and illustrated in the figures herein, could vary in a wide range of different process steps. Thus, the following more detailed description of the exemplary embodiments of the present invention, as represented in FIGS. 1-2 is not intended to limit the scope of the invention, as claimed, but is merely representative of presently preferred embodiments of the invention.

Figure 1:
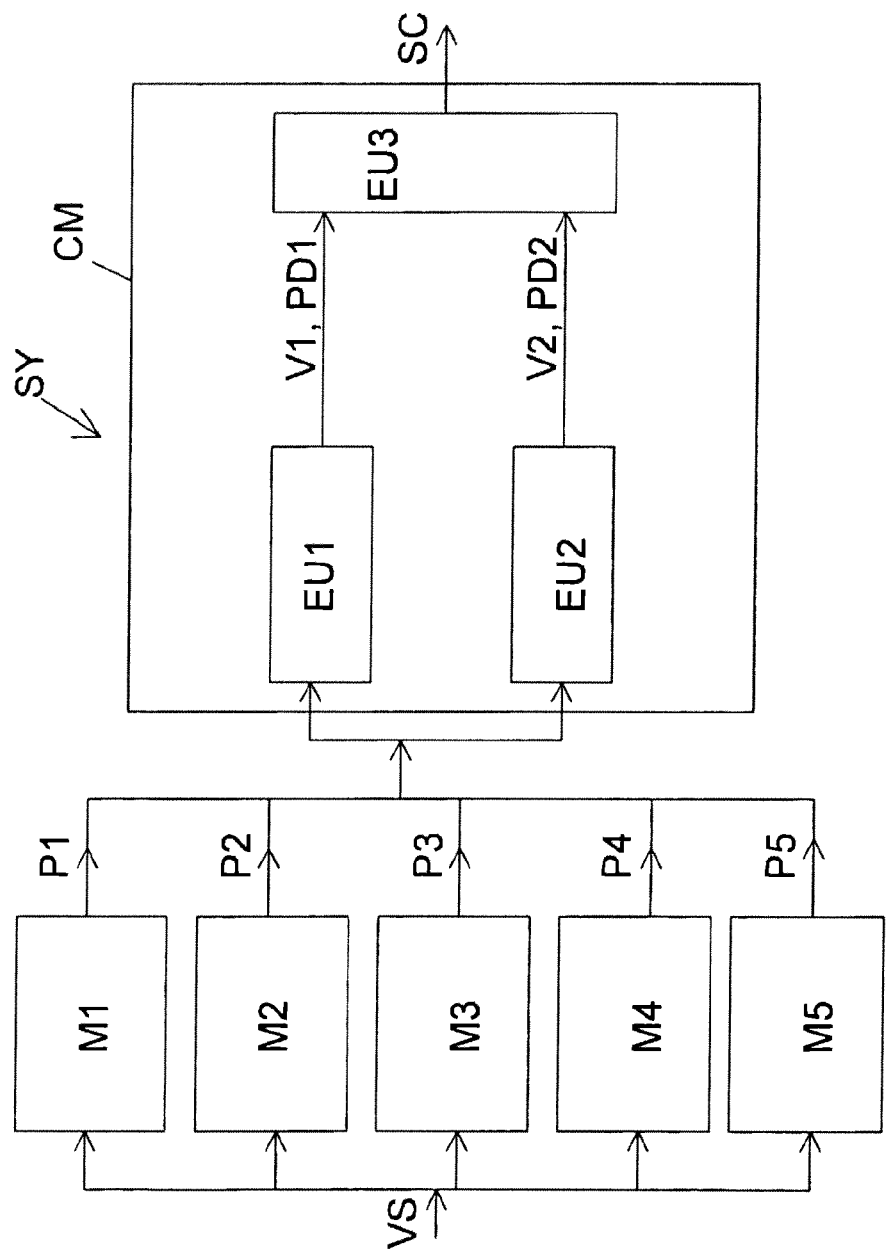
FIG. 1 shows an exemplary embodiment of an inventive system.
Figure 2:
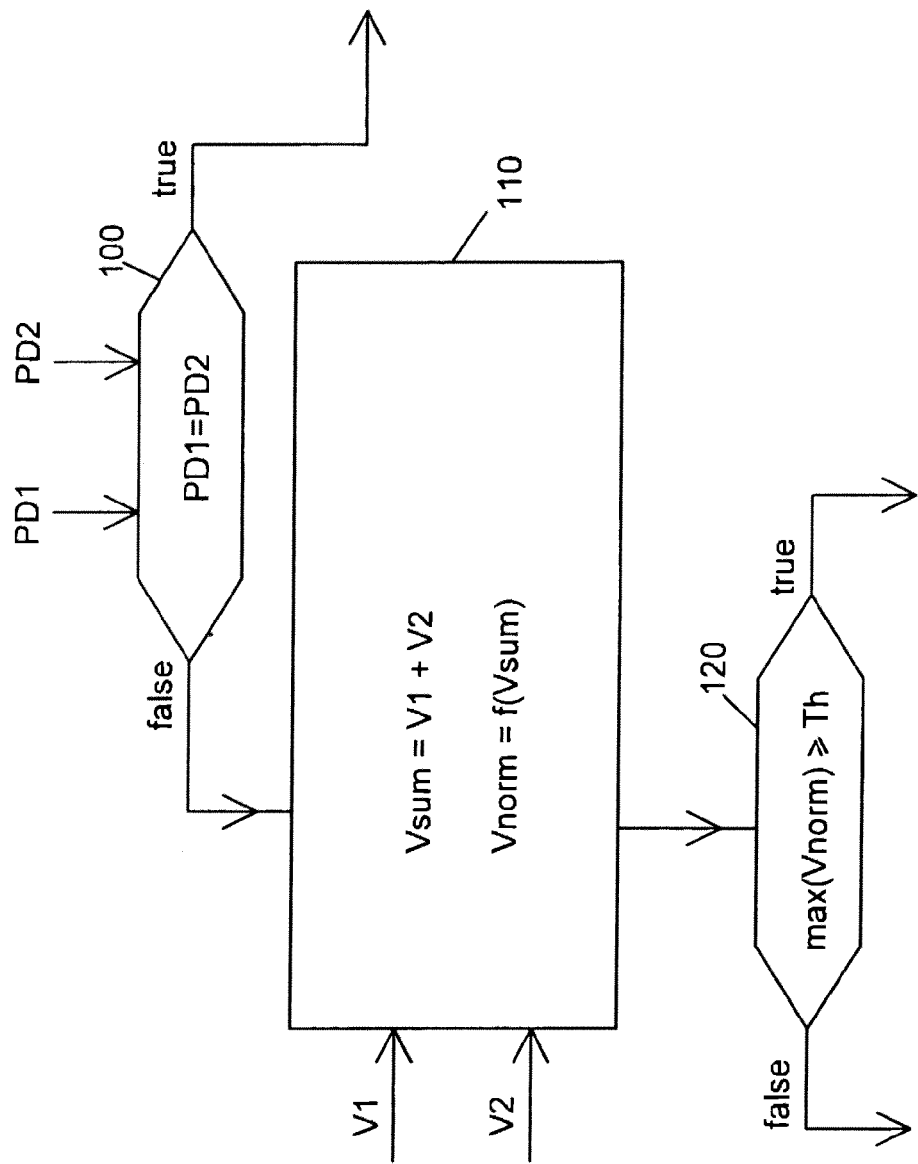
FIG. 2 shows an exemplary embodiment of a process flow which may be carried out by a combiner of the system shown in FIG. 1.

FIG. 1 shows an exemplary embodiment of a system SY for classifying a video sequence VS. The video sequence VS may be encoded, e. g. according to the MPEG-standard (MPEG: Moving Picture Experts Group). The video sequence VS preferably contains an image sequence and an audio sequence which correlate to each other.

The video sequence VS is put into a plurality of genre-specific detector modules M1, M2, M3, M4, and M5.

In the embodiment described hereinafter, the genre-specific detector module M1 is optimized for detecting cartoons. As such, the genre-specific detector module M1 is referred to hereinafter as cartoon-specific detector module M1. The cartoon-specific detector module M1 analyzes the video sequence VS in order to determine whether or not the video sequence may belong to the genre "cartoon". As a result of this analysis, the cartoon-specific detector module M1 provides a probability value P1 indicating the probability that the video sequence belongs to the genre "cartoon".

The genre-specific detector module M2 is preferably optimized for detecting commercials. As such, the genre-specific detector module M2 is referred to hereinafter as commercial-specific detector module M2. The commercial-specific detector module M2 analyzes the video sequence VS in order to determine whether or not the video sequence may belong to the genre "commercial". As a result of this analysis, the commercial-specific detector module M2 provides a probability value P2 indicating the probability that the video sequence belongs to the genre "commercial".

In the same fashion, the other genre-specific detector modules M3, M4, and M5 are optimized for detecting specific genres such as "music", "news", and "sport". As a result of their analysis, the music-specific detector module M3, the news-specific detector module M4 and the sport-specific detector module M5 provide probability values P3-P5 which indicate the probabilities that the video sequence VS belongs to the respective genre.

Of course, a person skilled in the art will be aware that the genre-specific detector modules M1-M5 may be optimized differently in order to detect other genres than those described above with respect to the embodiment shown in FIG. 1.

Genre-specific detector modules which may be used in the system shown in FIG. 1 are known to persons skilled in the art. For instance, a commercial-specific detector module is described in an exemplary fashion in US 2007/0261075A1. Other genre-specific detector modules are described for instance in the publication "New Real-Time Approaches for Video-Genre-Classification using High-Level Descriptors and a Set of Classifiers" (R. Glasberg, S. Schmiedeke, M. Mocigemba, T. Sikora, IEEE International Conference on Semantic Computing, pages 120-127, 2008).

The genre-specific detector modules M1-M5 are connected to a combiner CM. The combiner CM analyzes the probability values P1-P5 of the genre-specific detector modules M1-M5 and generates a classification signal SC.

The combiner CM comprises a first evaluating unit EU1. The first evaluating unit EU1 analyzes the probability values P1-P5 and provides a first probability vector V1. Vector V1 comprises for each genre a first probability value which indicates the probability that the video sequence VS belongs to the respective genre.

In a preferred embodiment, the first evaluating unit EU1 may use a product rule in order to determine the first probability vector V1. For instance, the first evaluating unit EU1 may calculate the first probability vector V1 according to the following equation:

$$\vec{P} = \begin{pmatrix} p1(\text{cartoon}) \\ p1(\text{commercial}) \\ p1(\text{music}) \\ p1(\text{news}) \\ p1(\text{sport}) \end{pmatrix}$$
$$= \begin{pmatrix} P1*(1-P2)*(1-P3)*(1-P4)*(1-P5) \\ (1-P1)*P2*(1-P3)*(1-P4)*(1-P5) \\ (1-P1)*(1-P2)*P3*(1-P4)*(1-P5) \\ (1-P1)*(1-P2)*(1-P3)*P4*(1-P5). \\ (1-P1)*(1-P2)*(1-P3)*(1-P4)*P5 \end{pmatrix}$$

wherein p1(cartoon) describes the first probability value of genre "cartoon", p1 (commercial) describes the first probability value of genre "commercial", p1 (music) describes the first probability value of genre "music", p1 (news) describes the first probability value of genre "news", and p1 (sport) describes the first probability value of genre "sport". P1-P5 are the probability values which are provided by genre-specific detector modules M1-M5.

E. g., vector V1 may show the following values:

$$V1 = \begin{pmatrix} p1(\text{cartoon}) \\ p1(\text{commercial}) \\ p1(\text{music}) \\ p1(\text{news}) \\ p1(\text{sport}) \end{pmatrix} = \begin{pmatrix} 0,47 \\ 0 \\ 0,01 \\ 0,01 \\ 0 \end{pmatrix}$$

In this example, vector V1 indicates that the video sequence VS is probably a cartoon sequence as the respective first probability value equals 47%. In contrast thereto, the probability values of the other genres are much smaller and vary between 0% and 1%.

The first evaluating unit EU1 further generates a first preliminary decision PD1 indicating which genre the video sequence presumably belongs to. In the example shown above, the first preliminary decision PD1 indicates that the video sequence VS presumably belongs to the genre "cartoon".

The first preliminary decision PD1 may be generated according to the following equation:

PD1=argmax(V1)="cartoon", wherein the function "argmax" determines the highest coordinate value of vector V1, which equals 0.47. The coordinate value of 0.47 is assigned to the genre "cartoon". As such, the first preliminary decision PD1 indicates a "cartoon" as the coordinate value of 0.47 exceeds all other coordinate values of vector V1.

The combiner CM further comprises a second evaluating unit EU2. The second evaluating unit also analyzes the probability values P1-P5 of the genre-specific detector modules M1-M5 and provides a second probability vector V2. The second probability vector V2 indicates for each genre a second probability value.

The second evaluating unit EU2 may comprise a Support Vector Machine which calculates the second probability vector V2.

A Support Vector Machine typically performs classification by constructing a N-dimensional hyperplane that separates data into categories. Using a kernel function, a Support Vector Machine may be an alternative training method for a radial basis function and multi-layer perceptron classifiers in which the weights of the network are found by solving a quadratic programming problem with linear constraints.

Support Vector Machines are well known to persons skilled in the art. More details thereon may be found for instance in the following publications: "The perceptron: A probabilistic model for information storage and organization in the brain (Rosenblatt, F.; Psychological Review 65 (1958); Nr. 6, S. 386-408), and "The nature of statistical learning theory" (Vapnik, V. N.; Springer Verlag; 2000).

Preferably the second evaluating unit EU2 uses a Support Vector Machine based on a Radial Basis Function, RBF, as kernel function, a cost parameter between 30000 and 35000 (e. g. 32758), and a 7-value of 8.

E. g., the second evaluating unit EU2 may calculate the following vector V2:

$$V2 = \begin{pmatrix} p2(\text{cartoon}) \\ p2(\text{commercial}) \\ p2(\text{music}) \\ p2(\text{news}) \\ p2(\text{sport}) \end{pmatrix} = \begin{pmatrix} 0,74 \\ 0,04 \\ 0,07 \\ 0,04 \\ 0,11 \end{pmatrix}$$

In this example, vector V2 indicates a probability of 740 that the video sequence VS shows a cartoon. The probability values of all other genres are much smaller and vary between 4% and 11%.

The second evaluating unit EU2 further generates a second preliminary decision PD2 indicating which genre the video sequence presumably belongs to. The second preliminary decision PD2 may be generated according to the following equation:

PD2=argmax(V2)="cartoon", wherein the function "argmax" determines the highest coordinate value of vector V2, which equals 0.74. The coordinate value of 0.74 is assigned to the genre cartoon. As such, the second preliminary decision PD2 indicates a "cartoon" as the coordinate value of 0.74 exceeds all other coordinate values of vector V2.

The combiner CM further comprises a third evaluating unit EU3 which is connected to the first and second evaluating units EU1 and EU2. The third evaluating unit EU3 generates the classification signal SC based on an evaluation of the first and second preliminary decisions PD1 and PD2 and based on an evaluation of the first and second probability vectors V1 and V2.

An exemplary embodiment of the evaluation process carried out in the third evaluating unit EU3 is shown in more detail in FIG. 2.

In a first step 100, the third evaluating unit EU3 checks whether the first and second preliminary decisions PD1 and PD2 are identical. If the first and second preliminary decision PD1 and PD2 indicate the same genre, a classification signal SC is generated which classifies the video sequence VS as belonging to the respective genre. Referring to the example discussed above, the third evaluating unit EU3 would generate a classification signal SC, which indicates a "cartoon", as both preliminary decisions PD1 and PD2 indicate a "cartoon" as the most probable genre.

However, if the first and second preliminary decisions indicate different genres, the first and second probability vectors are further analyzed and the classification signal SC is generated based on the result of this analysis.

Referring to FIG. 2, in step 110, the third evaluating unit EU3 adds the first and second probability vectors V1 and V2 and generates a sum vector Vsum:

$$Vsum = V1 + V2$$

$$= \begin{pmatrix} ps(\text{cartoon}) \\ ps(\text{commercial}) \\ ps(\text{music}) \\ ps(\text{news}) \\ ps(\text{sport}) \end{pmatrix}$$

$$= \begin{pmatrix} p1(\text{cartoon}) + p2(\text{cartoon}) \\ p1(\text{commercial}) + p2(\text{commercial}) \\ p1(\text{music}) + p2(\text{music}) \\ p1(\text{news}) + p2(\text{news}) \\ p1(\text{sport}) + p2(\text{sport}) \end{pmatrix}$$

In this sum vector Vsum, each coordinate is assigned to a specific genre.

Then, the sum vector Vsum is normalized and a normalized sum vector Vnorm is generated, preferably according to the following equation:

$$Vnorm = \begin{pmatrix} ps(\text{cartoon})/L \\ ps(\text{commercial})/L \\ ps(\text{music})/L \\ ps(\text{news})/L \\ ps(\text{sport})/L \end{pmatrix},$$

wherein L designates the length of the sum vector Vsum. L may be calculated as follows:

$$L = |Vsum| =$$
$$\sqrt{ps(\text{cartoon})^2 + ps(\text{commercial})^2 + ps(\text{music})^2 + ps(\text{news})^2 + ps(\text{sport})^2}$$

Then, the normalized sum vector Vnorm is subjected to comparison step 120 as follows:

max(Vnorm)≥Th

If the highest coordinate value of the normalized sum vector Vnorm equals or exceeds a reference value Th (e. g. Th=50%), the third evaluating unit EU3 determines the genre g of the video sequence VS as follows:

$$g = \mathrm{argmax}(Vnorm).$$

Then, a classification signal SC is generated which classifies the video sequence VS as belonging to genre g. E. g. the classification signal SC may have the following form:

$$SC = \text{"cartoon"}$$

If, however, the highest coordinate value of the normalized sum vector Vnorm is smaller than the reference value Th, the third evaluating unit EU3 generates a classification signal SC, which indicates an unreliable classification result, e.g. as follows:

$$SC = \text{"unreliable result"}$$

Reference Signs
EU1 first evaluating unit
EU2 second evaluating unit
EU3 third evaluating unit
g genre
M1 genre-specific detector module
M2 genre-specific detector module
M3 genre-specific detector module
M4 genre-specific detector module
M5 genre-specific detector module
P1 probability value
P2 probability value
P3 probability value
P4 probability value
P5 probability value
CM combiner
SC classification signal
V1 first probability vector
V2 second probability vector
Vnorm normalized sum vector
Vsum sum vector
VS video sequence
p1 (genre) first probability value of genre indicated
p2 (genre) second probability value of genre indicated
PD1 first preliminary decision
PD2 second preliminary decision
SY system
100-120 method steps

The invention claimed is:

1. Method for classifying a video sequence (VS), characterized by
analyzing the video sequence using a plurality of genre-specific detector modules (M1-M5), each genre-specific detector module providing a probability value (P1-P5) indicating the probability that the video sequence belongs to the genre assigned to the genre-specific detector module; and
analyzing the probability values of the plurality of genre-specific detector modules using a combiner (CM) which analyzes said probability values and generates a classification signal (SC) classifying the video sequence as belonging to a specific genre (g);
wherein the probability values of the plurality of genre-specific detector modules are analyzed by a first evaluating unit (EU1) of said combiner, said first evaluating unit providing a first probability vector (V1) comprising for each genre a first probability value indicating the probability that the video sequence belongs to the respective genre, and a first preliminary decision (PD1) indicating which genre the video sequence presumably belongs to,
the probability values of the plurality of genre-specific detector modules are further analyzed by a second evaluating unit (EU2) of said combiner, said second evaluating unit providing a second probability vector (V2) indicating for each genre a second probability value indicating the probability that the video sequence belongs to the respective genre, and a second preliminary decision (PD2) indicating which genre the video sequence presumably belongs to, wherein the first evaluating unit and the second evaluating unit differ in their analyzing algorithm; and
said classification signal is generated based on an evaluation of said first and second preliminary decisions,
wherein if the first and second preliminary decision indicate the same genre, a classification signal is generated which classifies the video sequence as belonging to said same genre, wherein if the first and second preliminary decision indicate different genres, the first and second probability vectors are further analyzed and the classification signal is generated based on the result of said analysis,
wherein the step of generating said classification signal includes:
adding the first and second probability vectors and generating a sum vector (Vsum), each coordinate of said sum vector being assigned to a specific genre;
determining the highest coordinate value of the sum vector;
determining the genre which is assigned to the coordinate with the highest coordinate value; and
generating a classification signal which classifies the video sequence as belonging to the genre associated with the coordinate having the highest coordinate value.

2. The method according to claim 1, wherein the step of generating said classification signal further includes:
normalizing said vector sum;
comparing the highest coordinate value of the normalized sum vector (Vnorm) to a reference value (Th); and
generating a classification signal that indicates an unreliable classification result if the highest coordinate value is smaller than the reference value.

3. Method for classifying a video sequence (VS), characterized by
analyzing the video sequence using a plurality of genre-specific detector modules (M1-M5), each genre-specific detector module providing a probability value (P1-P5) indicating the probability that the video sequence belongs to the genre assigned to the genre-specific detector module; and
analyzing the probability values of the plurality of genre-specific detector modules using a combiner (CM) which analyzes said probability values and generates a classification signal (SC) classifying the video sequence as belonging to a specific genre (g);
wherein the probability values of the plurality of genre-specific detector modules are analyzed by a first evaluating unit (EU1) of said combiner, said first evaluating unit providing a first probability vector (V1) comprising for each genre a first probability value indicating the probability that the video sequence belongs to the respective genre, and a first preliminary decision (PD1) indicating which genre the video sequence presumably belongs to,
the probability values of the plurality of genre-specific detector modules are further analyzed by a second evaluating unit (EU2) of said combiner, said second evaluating unit providing a second probability vector (V2) indicating for each genre a second probability value indicating the probability that the video sequence belongs to the respective genre, and a second preliminary decision (PD2) indicating which genre the video sequence presumably belongs to, wherein the first evaluating unit and the second evaluating unit differ in their analyzing algorithm; and said classification signal is generated based on an evaluation of said first and second preliminary decisions, wherein if the first and second preliminary decision indicate the same genre, a classification signal is generated which classifies the video sequence as belonging to said same genre, wherein if the first and second preliminary decision indicate different genres, the first and second probability vectors are further analyzed and the classification signal is generated based on the result of said analysis, wherein the step of generating said classification signal further includes:

adding the first and second probability vectors and generating a sum vector, each coordinate of said sum vector being assigned to a specific genre;

normalizing said sum vector;

determining the highest coordinate value of the normalized sum vector;

comparing said highest coordinate value of the normalized sum vector to a reference value; and generating a classification signal indicating an unreliable classification result if the highest coordinate value is smaller than the reference value.

4. Method for classifying a video sequence (VS), characterized by analyzing the video sequence using a plurality of genre-specific detector modules (M1- M5), each genre-specific detector module providing a probability value (P1-P5) indicating the probability that the video sequence belongs to the genre assigned to the genre-specific detector module; and analyzing the probability values of the plurality of genre-specific detector modules using a combiner (CM) which analyzes said probability values and generates a classification signal (SC) classifying the video sequence as belonging to a specific genre (g);

wherein the probability values of the plurality of genre-specific detector modules are analyzed by a first evaluating unit (EU1) of said combiner, said first evaluating unit providing a first probability vector (V1) comprising for each genre a first probability value indicating the probability that the video sequence belongs to the respective genre, and a first preliminary decision (PD1) indicating which genre the video sequence presumably belongs to, the probability values of the plurality of genre-specific detector modules are further analyzed by a second evaluating unit (EU2) of said combiner, said second evaluating unit providing a second probability vector (V2) indicating for each genre a second probability value indicating the probability that the video sequence belongs to the respective genre, and a second preliminary decision (PD2) indicating which genre the video sequence presumably belongs to, wherein the first evaluating unit and the second evaluating unit differ in their analyzing algorithm; and said classification signal is generated based on an evaluation of said first and second preliminary decisions, wherein the first evaluating unit of said combiner calculates said first probability vector based on a given product rule, wherein the first evaluating unit of said combiner calculates the first probability vector (V1) according to the following equation:

$$V1 = \begin{pmatrix} P1*(1-P2)*\ldots*(1-Pi)*\ldots*(1-Pn) \\ (1-P1)*P2*\ldots*(1-Pi)*\ldots*(1-Pn) \\ (1-P1)*(1-P2)*\ldots*Pi*\ldots*(1-Pn) \\ \ldots \\ (1-P1)*(1-P2)*\ldots*(1-Pi)*\ldots*Pn \end{pmatrix}$$

wherein Pi ($1 \leq i \leq n$) defines the probability value provided by the $i^{th}$ genre-specific detector module associated with the $i^{th}$ genre, and n defines the number of genres and genre-specific detector modules.

5. Method for classifying a video sequence (VS), characterized by analyzing the video sequence using a plurality of genre-specific detector modules (M1-M5), each genre-specific detector module providing a probability value (P1-P5) indicating the probability that the video sequence belongs to the genre assigned to the genre-specific detector module; and analyzing the probability values of the plurality of genre-specific detector modules using a combiner (CM) which analyzes said probability values and generates a classification signal (SC) classifying the video sequence as belonging to a specific genre (g);

wherein the probability values of the plurality of genre-specific detector modules are analyzed by a first evaluating unit (EU1) of said combiner, said first evaluating unit providing a first probability vector (V1) comprising for each genre a first probability value indicating the probability that the video sequence belongs to the respective genre, and a first preliminary decision (PD1) indicating which genre the video sequence presumably belongs to, the probability values of the plurality of genre-specific detector modules are further analyzed by a second evaluating unit (EU2) of said combiner, said second evaluating unit providing a second probability vector (V2) indicating for each genre a second probability value indicating the probability that the video sequence belongs to the respective genre, and a second preliminary decision (PD2) indicating which genre the video sequence presumably belongs to, wherein the first evaluating unit and the second evaluating unit differ in their analyzing algorithm; and said classification signal is generated based on an evaluation of said first and second preliminary decisions, wherein the second evaluating unit of said combiner calculates said second probability vector using a support vector machine, wherein the second evaluating unit of said combiner uses a support vector machine having a Radial Basis Function, RBF, as kernel function and/or a cost parameter between 30000 and 35000 and/or a γ-value of 8.

* * * * *